J. C. KAMP & A. E. FINCH.
PULLEY.
APPLICATION FILED DEC. 18, 1912.

1,102,928.

Patented July 7, 1914.

Witnesses
Wm H. Mulligan.
P. M. Smith.

Inventors
A. E. Finch
J. C. Kamp
By Victor J. Evans.
Attorney

UNITED STATES PATENT OFFICE.

JOHN C. KAMP AND ALBERT E. FINCH, OF BUFFALO, NEW YORK.

PULLEY.

1,102,928.

Specification of Letters Patent.

Patented July 7, 1914.

Application filed December 18, 1912. Serial No. 737,474.

*To all whom it may concern:*

Be it known that we, JOHN C. KAMP and ALBERT E. FINCH, citizens of the United States, residing at Buffalo, in the county of Erie and State of New York, have invented new and useful Improvements in Pulleys, of which the following is a specification.

This invention relates to pulleys, the object in view being to provide a sectional or built up pulley, embodying a leather rim which is so combined with the remainder of the pulley that it is held firmly in place and prevented from creeping.

A further object of the invention is to provide a pulley, embodying superior friction qualities for transmitting power with a minimum loss, enabling driving belts to be run in a slack condition with all the beneficial results due to the looseness of the belt, the pulley also embodying great durability in construction, and economy in manufacture.

With the above and other objects in view, the invention consists in the construction, combination and arrangement of parts, as will be hereinafter more fully described, illustrated in the accompanying drawings, and pointed out in the claims hereunto appended.

Figure 1:
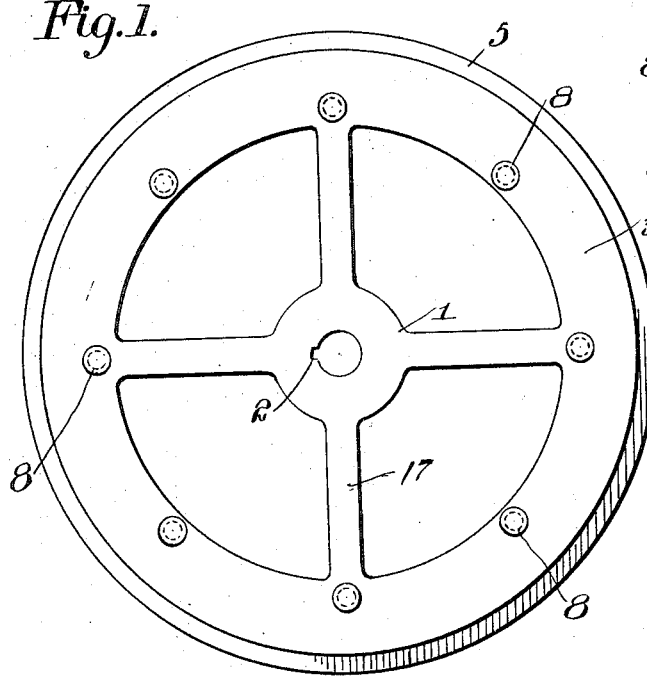
Figure 2:
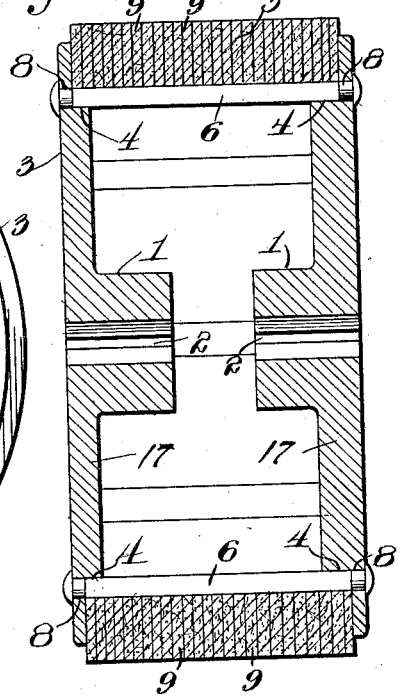
Figure 3:
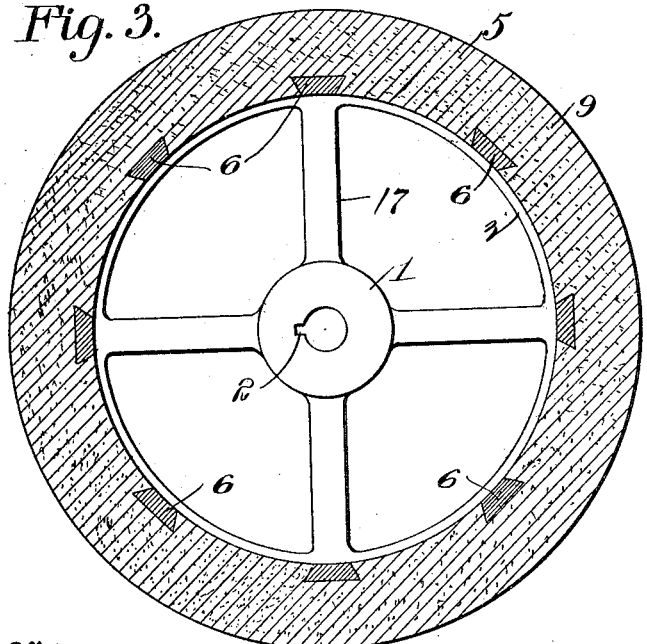
Figure 4:
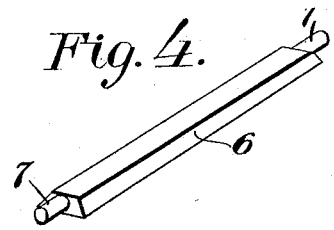
Figure 5:

In the drawings: Figure 1 is a side elevation of a pulley embodying the present invention. Fig. 2 is a diametrical section through the same. Fig. 3 is a longitudinal section through the pulley taken at right angles to Fig. 2. Fig. 4 is a detail perspective view of one of the keys. Fig. 5 is an end view of the same.

In the construction of pulleys of a comparatively large size, we provide a hub which is formed in two parts, as illustrated in Fig. 2, wherein 1 designates the two hub sections, each bored out and provided with key-ways 2 extending through the same and adapted to receive either one long key equal to the entire length of the divided hub, or two shorter keys, one for each hub section. Each of the hub sections is provided at its outer end with a circumferential flange 3 of a diameter corresponding with the size of the pulley to be constructed and connected to the respective hub section by spokes 17. Each of the flanges is internally rabbeted, as shown at 4, in the inside face of its outer margin, in order to receive the rim 5, the opposite edges of which are seated in the rabbets in the flanges 3, as clearly illustrated in Fig. 2.

A circular series of rim supporting keys 6 connect the flanges 3 and form a backing support for the rim 5. Each of said keys 6 is dove-tailed in cross section, as illustrated, and is provided at its opposite extremities with studs 7 which are inserted through holes 8 in the flange 3. Each of said keys is embedded in the inner surface of the rim 5. This rim 5 is formed of leather by assembling any desired number of plies or laminations 9, and cementing the same firmly together. The rim is designed to be built up from a suitable number of layers or scraps and buffings of leather, all being held firmly together by cement, or the equivalent thereof. Any desired number of keys 6 may be provided to form a backing support for the inner face of the leather rim 5, and after the studs 7 are inserted through the holes 8 in the flanges, they are firmly riveted, thereby holding all parts of the pulley together as a unit.

From the foregoing description, it will be seen that the leather rim is firmly supported by the keys, and that it is locked to the keys, so as to prevent the same from creeping circumferentially of the pulley.

It will now be understood that the leather tread or rim of the pulley is held between the flanges which are drawn and held together by bolts, the said flanges confining the tread between them. It will further be seen that the tread is keyed to the body of the pulley and prevented from creeping circumferentially around the same, at the same time avoiding any possibility of the leather tread being thrown off of the pulley by an excessive speed of rotation thereof, the dovetail shaped keys serving to lock the leather tread in place on the metal rim of the pulley in all directions, except laterally, any lateral movement of the tread being prevented by the oppositely located confining flanges.

What is claimed is:

1. A built up pulley comprising a hub, flanges at opposite ends of the hub, a rim held between said flanges, and rim supporting keys of dovetail shape embedded in the inner face of said rim and having end shoulders bearing against said flanges, and studs projecting beyond said shoulders through said flanges.

2. A built up pulley comprising a hub, flanges at opposite ends of the hub, a rim held between said flanges, and rim supporting keys of dovetail shape embedded in the inner face of said rim and having end shoulders bearing against said flanges, and studs projecting beyond said shoulders through said flanges, said flanges being fastened on said studs.

3. A built up pulley comprising a hub, flanges at opposite ends of the hub, a rim held between said flanges, and rim supporting keys of dovetail shape embedded in the inner face of said rim and having end shoulders bearing against said flanges and studs projecting beyond said shoulders through said flanges, said studs being supported by said flanges.

In testimony whereof we affix our signatures in presence of two witnesses.

JOHN C. KAMP.
ALBERT E. FINCH.

Witnesses:
CHARLES A. HAHL,
THOS. V. WOJCIECHOWSKH.

---

Copies of this patent may be obtained for five cents each, by addressing the "Commissioner of Patents, Washington, D. C."